United States Patent
Yanagi et al.

(10) Patent No.: US 10,893,388 B2
(45) Date of Patent: Jan. 12, 2021

(54) MAP GENERATION DEVICE, MAP GENERATION SYSTEM, MAP GENERATION METHOD, AND NON-TRANSITORY STORAGE MEDIUM INCLUDING INSTRUCTIONS FOR MAP GENERATION

(71) Applicant: TOYOTA JIDOSHA KABUSHIKI KAISHA, Toyota (JP)

(72) Inventors: Takuro Yanagi, Toyota (JP); Maki Tamura, Nisshin (JP); Mutsumi Matsuura, Okazaki (JP); Toshihiko Inoue, Toyota (JP); Naoki Yamamuro, Nagoya (JP); Takashi Hayashi, Aichi-gun (JP); Takahiro Shiga, Chiryu (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 16/666,583

(22) Filed: Oct. 29, 2019

(65) Prior Publication Data
US 2020/0204955 A1    Jun. 25, 2020

(30) Foreign Application Priority Data
Dec. 21, 2018  (JP) ................. 2018-240121

(51) Int. Cl.
*H04W 4/029*  (2018.01)
*G06K 9/00*  (2006.01)
*H04W 4/48*  (2018.01)

(52) U.S. Cl.
CPC ........ *H04W 4/029* (2018.02); *G06K 9/00281* (2013.01); *G06K 9/00845* (2013.01); *H04W 4/48* (2018.02); *G06K 2209/21* (2013.01)

(58) Field of Classification Search
CPC ......... H04W 4/029; H04W 4/48; H04W 4/02; H04W 4/40; G06K 9/00845; G06K 9/00281; G06K 2209/21; G01C 21/3602; G01C 21/3826; G01C 21/3841; H04N 5/23229; G08G 1/123; G09B 29/006
See application file for complete search history.

(56) References Cited

U.S. PATENT DOCUMENTS

| | | | | |
|---|---|---|---|---|
| 2014/0207281 A1* | 7/2014 | Angle | ................... | H04L 12/282 700/257 |
| 2016/0318368 A1* | 11/2016 | Alger | ................. | G01C 21/3453 |
| 2017/0344858 A1* | 11/2017 | Ohira | ................. | G06K 9/00771 |

(Continued)

FOREIGN PATENT DOCUMENTS

| | | |
|---|---|---|
| JP | 2004-310397 A | 11/2004 |
| JP | 2008-083932 A | 4/2008 |

*Primary Examiner* — Brian Wilson
(74) *Attorney, Agent, or Firm* — Oblon, McClelland, Maier & Neustadt, L.L.P.

(57) ABSTRACT

A map generation device includes: a communication unit that acquires position information about a vehicle at a time when an image is photographed from the vehicle; and a control unit that estimates a dispersion state of pollen, based on the position information about the vehicle acquired by the communication unit and detection information indicating a result of a first detection in the image, and generates map information indicating the estimated dispersion state, the first detection in the image being a detection of a person that wears an anti-pollen article.

9 Claims, 5 Drawing Sheets

(56) References Cited

U.S. PATENT DOCUMENTS

| | | | |
|---|---|---|---|
| 2018/0004866 A1* | 1/2018 | Lynar | G06F 17/18 |
| 2019/0149598 A1* | 5/2019 | Sawada | G05D 1/0297 |
| | | | 701/2 |
| 2019/0212740 A1* | 7/2019 | Matsui | G06Q 50/30 |

* cited by examiner

MAP GENERATION DEVICE, MAP GENERATION SYSTEM, MAP GENERATION METHOD, AND NON-TRANSITORY STORAGE MEDIUM INCLUDING INSTRUCTIONS FOR MAP GENERATION

INCORPORATION BY REFERENCE

The disclosure of Japanese Patent Application No. 2018-240121 filed on Dec. 21, 2018 including the specification, drawings and abstract is incorporated herein by reference in its entirety.

BACKGROUND

1. Technical Field

The present disclosure relates to a map generation device, a map generation system, a map generation method, and a non-transitor storage medium including instructions for map generation.

2. Description of Related Art

Japanese Patent Application Publication No. 2004-310397 (JP 2004-310397 A) and Japanese Patent Application Publication No. 2008-083932 (JP 2008-083932 A) describe technologies for determining whether a person wears a mask, from an image obtained by photographing the face of the person.

SUMMARY

In pollen information that is currently provided as part of a weather information service, a pollen dispersion amount is predicted for each broad area. Because of a coarse granularity, the pollen information is not information that is truly useful for a user suffering from hay fever.

An object of the present disclosure is to obtain granular information relevant to the dispersion state of the pollen.

A map generation device according to an embodiment of the present disclosure includes: a communication unit that acquires position information about a vehicle at a time when an image is photographed from the vehicle; and a control unit that estimates a dispersion state of pollen, based on the position information about the vehicle acquired by the communication unit and detection information indicating a result of a first detection in the image, and generates map information indicating the estimated dispersion state, the first detection in the image being a detection of a person that wears an anti-pollen article.

A map generation method according to an embodiment of the present disclosure includes: a communication unit acquiring position information about a vehicle at a time when an image is photographed from the vehicle; and a control unit estimating a dispersion state of pollen, based on the position information about the vehicle acquired by the communication unit and detection information indicating a result of a first detection in the image, and generating map information indicating the estimated dispersion state, the first detection in the image being a detection of a person that wears an anti-pollen article.

A non-transitory storage medium according to an embodiment of the present disclosure stores instructions that are executable by one or more processors and that cause the one or more processors to perform functions which including: acquiring position information about a vehicle at a time when an image is photographed from the vehicle; and estimating a dispersion state of pollen, based on the acquired position information about the vehicle and detection information indicating a result of a first detection in the image, and generating map information indicating the estimated dispersion state, the first detection in the image being a detection of a person that wears an anti-pollen article.

With an embodiment of the present disclosure, it is possible to obtain granular information relevant to the dispersion state of the pollen.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

Hereinafter, an embodiment of the present disclosure will be described with respect to the drawings.

In the drawings, identical or equivalent parts are denoted by identical reference characters. In the description of the embodiment, descriptions of identical or equivalent parts are omitted or simplified when appropriate.

Figure 1:
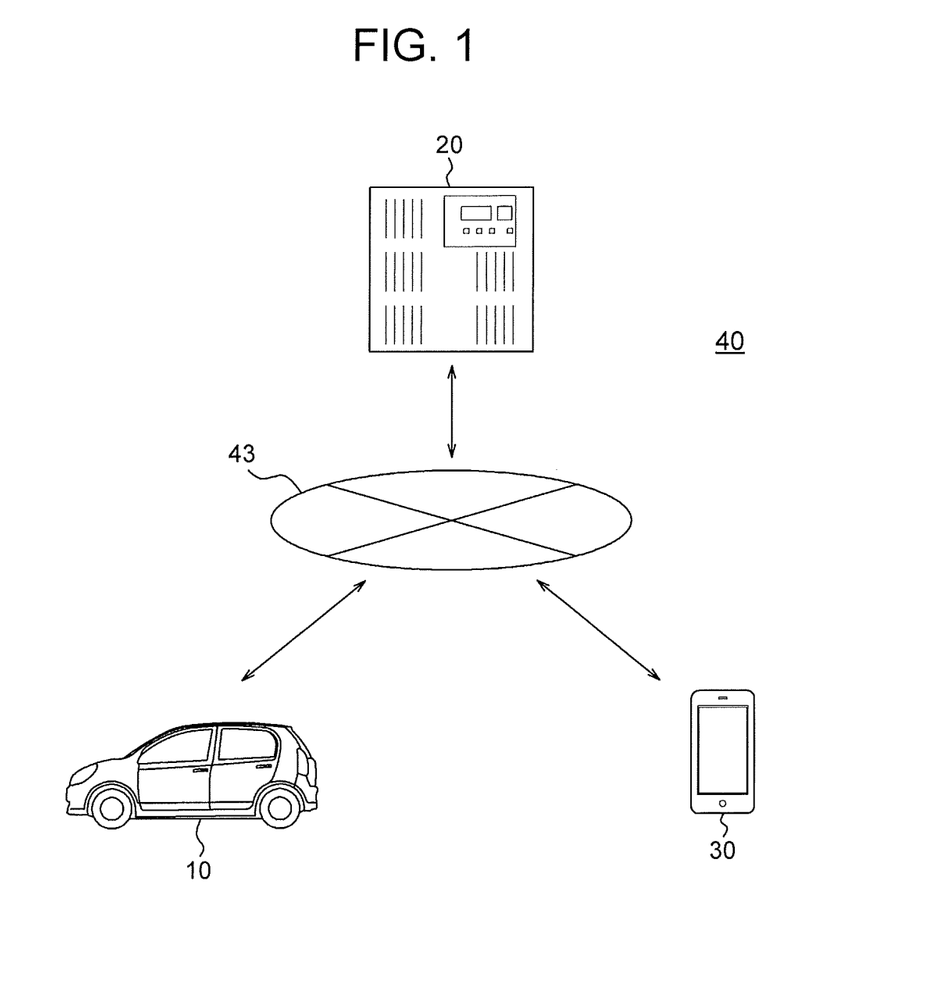
FIG. 1 is a schematic diagram showing a configuration of a map generation system according to an embodiment of the present disclosure.
Figure 2:
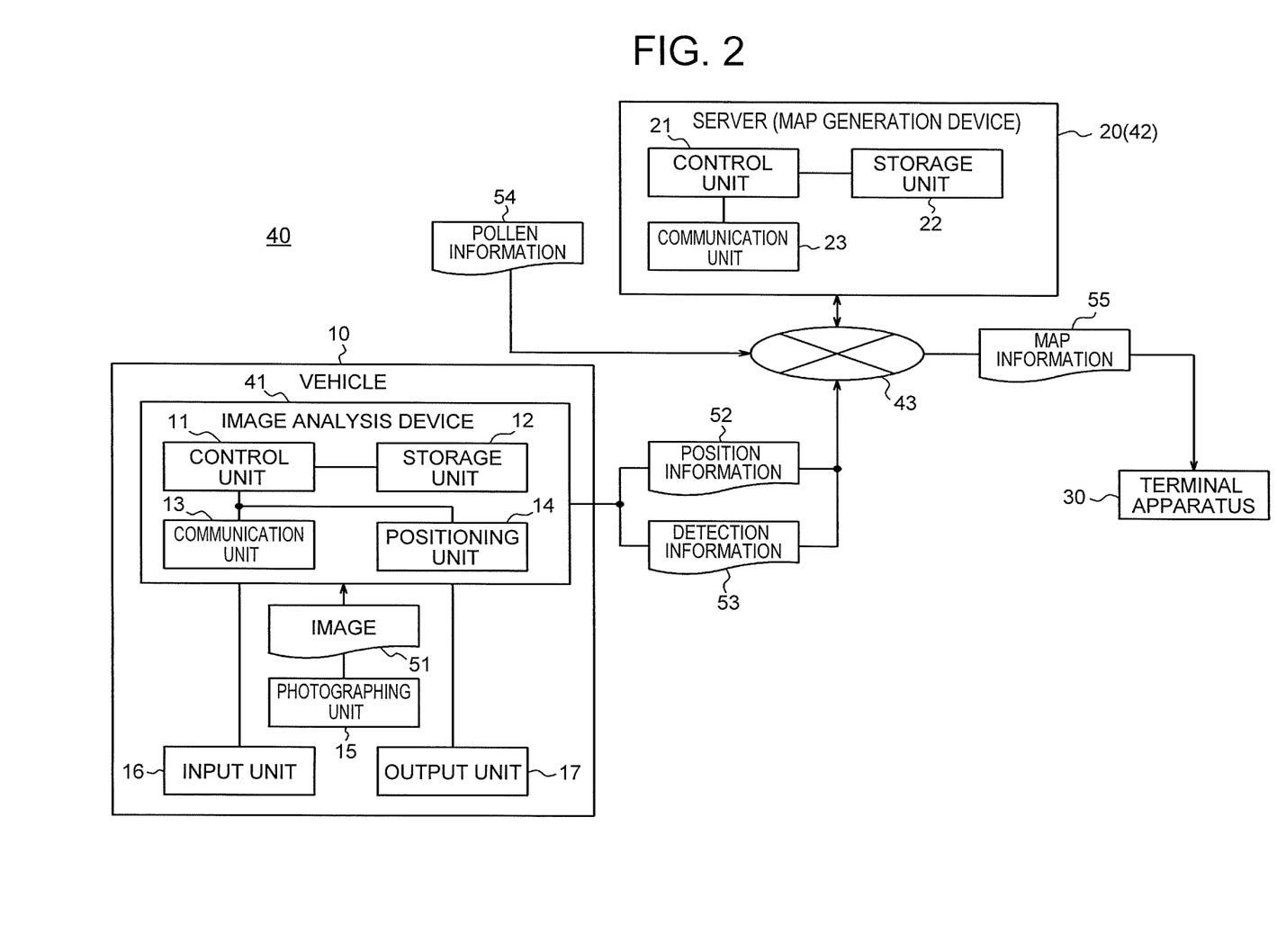
FIG. 2 is a block diagram showing a configuration of a map generation system according to the embodiment of the present disclosure.

An outline of the embodiment will be described with reference to FIG. 1 and FIG. 2.

A communication unit 23 of a map generation device 42 acquires position information 52 about a vehicle 10 at the time when an image 51 is photographed from the vehicle 10. A control unit 21 of the map generation device 42 estimates the dispersion state of pollen, based on the position information 52 about the vehicle 10 acquired by the communication unit 23 and detection information 53 indicating a result of a detection of a person that wears an anti-pollen article in the image 51. The control unit 21 generates map information 55 indicating the estimated dispersion state.

In the embodiment, the control unit 21 estimates a pollen dispersion amount at a position where the image 51 is photographed, based on the state of wearing of an anti-pollen article such as a mask or glasses of a person shown on the image 51 photographed from the vehicle 10. As a result, the control unit 21 generates the map information 55 indicating the pollen dispersion amount at a specific position, instead of the pollen dispersion amount in each broad area, unlike pollen information 54 that is currently provided.

As the image 51, for example, a moving image continuously photographed from the vehicle 10 that is moving can be used. Alternatively, a plurality of still images intermittently photographed from the vehicle 10 that is moving can be used. Alternatively, a plurality of images individually photographed from a plurality of vehicles 10 at different positions can be used. In all cases, the pollen dispersion amount at each specific position is estimated. As a result, the map information 55 indicating the pollen dispersion amount at each specific position is generated. For example, it is possible to generate the map information 55 indicating pollen dispersion amounts at various positions in one or more areas.

Thus, the embodiment gives granular information relevant to the dispersion state of pollen. That is, the embodiment gives information that is useful for a user suffering from hay fever.

In the embodiment, the vehicle 10 is an automobile, but may be another type of vehicle.

A configuration of a map generation system 40 according to the embodiment will be described with reference to FIG. 2.

The map generation system 40 includes an image analysis device 41 and a map generation device 42.

The image analysis device 41 and the map generation device 42 can communicate with each other, through a network 43 such as a mobile communication network and the internet. The map generation device 42 can communicate with a terminal apparatus 30 through the network 43.

The image analysis device 41 is included in the vehicle 10. The image analysis device 41 may be configured as an in-vehicle apparatus such as a navigation device, or may be configured as an electronic apparatus to be used while being connected with an in-vehicle apparatus such as a smartphone.

The image analysis device 41 includes constituent elements such as a control unit 11, a storage unit 12, a communication unit 13, and a positioning unit 14.

The control unit 11 is constituted by one or more processors. As the processors, a general-purpose processor such as a CPU or a dedicated processor specialized for a particular process can be used. The "CPU" is an abbreviation of Central Processing Unit. The control unit 11 may include one or more dedicated circuits, or in the control unit 11, one or more processors may be replaced with one or more dedicated circuits. As the dedicated circuit, for example, a FPGA or an ASIC can be used. The "FPGA" is an abbreviation of Field-Programmable Gate Array. The "ASIC" is an abbreviation of Application Specific Integrated Circuit. The control unit 11 may include one or more ECUs. The "ECU" is an abbreviation of Electronic Control Unit. The control unit 11 executes information processing relevant to a behavior of the image analysis device 41, while controlling parts of the vehicle 10 that include the image analysis device 41.

The storage unit 12 is constituted by one or more memories. As the memory, for example, a semiconductor memory, a magnetic memory or an optical memory can be used. The memory may function as a main storage device, an auxiliary storage device or a cache memory. In the storage unit 12, information to be used for the behavior of the image analysis device 41 and information obtained by the behavior of the image analysis device 41 are stored.

The communication unit 13 is constituted by one or more communication modules. As the communication module, for example, a communication module for DSRC, LTE, 4G or 5G can be used. The "DSRC" is an abbreviation of Dedicated Short Range Communications. The "LTE" is an abbreviation of Long Term Evolution. The "4G" is an abbreviation of 4th Generation. The "5G" is an abbreviation of 5th Generation. The communication unit 13 receives the information to be used for the behavior of the image analysis device 41, and sends the information obtained by the behavior of the image analysis device 41.

The positioning unit 14 is constituted by one or more positioning modules. As the positioning module, for example, a positioning module for GPS, QZSS, GLONASS or Galileo can be used. The "GPS" is an abbreviation of Global Positioning System. The "QZSS" is an abbreviation of Quasi-Zenith Satellite System. A satellite for QZSS is called a quasi-zenith satellite system. The "GLONASS" is an abbreviation of Global Navigation Satellite System. The positioning unit 14 acquires the position information 52 about the vehicle 10.

A function of the image analysis device 41 is realized when an image analysis program according to the embodiment is executed by the processor included in the control unit 11. That is, the function of the image analysis device 41 is realized by software. The image analysis program is a program for causing a computer to realize a function corresponding to a step included in the behavior of the image analysis device 41 by causing the computer to execute the step. That is, the image analysis program is a program for causing the computer to function as the image analysis device 41.

The program can be recorded in a computer-readable recording medium. As the computer-readable recording medium, for example, a magnetic recording device, an optical disk, a magneto-optical recording medium or a semiconductor memory can be used. The distribution of the program is performed, for example, by performing sale, transfer or rental of a portable recording medium such as a DVD or a CD-ROM in which the program is recorded. The "DVD" is an abbreviation of Digital Versatile Disc. The "CD-ROM" is an abbreviation of Compact Disc Read Only Memory. The program may be distributed by storing the program in a storage of a server and transmitting the program from the server to another computer through a network. The program may be provided as a program product.

For example, in a memory, the computer stores the program recorded in the portable recording medium or the program transmitted from the server, once. Then, the computer reads the program stored in the memory, with a processor, and executes a process in accordance with the read program, with the processor. The computer may read the program directly from the portable recording medium, and may execute the process in accordance with the program. The computer may execute the process in accordance with the received program, whenever the program is transmitted from the server to the computer. The computer may execute the process with a so-called ASP type service in which a function is realized only by execution instruction and result acquisition without the transmission of the program from the server to the computer. The "ASP" is an abbreviation of Application Service Provider. The program includes information that is used for a process by an electronic computer and that is equivalent to a program. For example, data having a property of not directly instructing the computer but specifying the process by the computer is included in the "information that is equivalent to a program".

Some or all of the functions of the image analysis device 41 may be realized by a dedicated circuit included in the control unit 11. That is, some or all of the functions of the image analysis device 41 may be realized by hardware.

The vehicle 10 includes a photographing unit 15, an input unit 16 and an output unit 17, in addition to the image analysis device 41. In the vehicle 10, the photographing unit 15, the input unit 16 and the output unit 17 may constitute a part of the image analysis device 41.

The photographing unit 15 is constituted by one or more in-vehicle cameras. As the in-vehicle camera, for example, a front camera, a side camera or a rear camera can be used. The photographing unit 15 photographs the image 51 from the vehicle 10. That is, the photographing unit 15 photographs the image 51 of the exterior of the vehicle 10.

The input unit 16 is constituted by one or more input interfaces. As the input interface, for example, a physical key, a capacitive key, a pointing device, a touch screen provided integrally with an in-vehicle display, or an in-vehicle microphone can be used. The input unit 16 accepts an input of the information to be used for the behavior of the image analysis device 41, from a user such as a driver of the vehicle 10.

The output unit 17 is constituted by one or more output interfaces. As the output interface, for example, an in-vehicle display or an in-vehicle speaker can be used. As the in-vehicle display, for example, a HUD, an LCD or an organic EL display can be used. The "HUD" is an abbreviation of Head-Up Display. The "LCD" is an abbreviation of Liquid Crystal Display. The "EL" is an abbreviation of Electro Luminescence. The output unit 17 outputs the information obtained by the behavior of the image analysis device 41, to the user.

The map generation device 42 may be provided in an arbitrary place. In the embodiment, the map generation device 42 is provided in a data center. The map generation device 42 is configured as a server 20 in a cloud computing system or another computing system.

The map generation device 42 includes constituent elements such as a control unit 21, a storage unit 22 and a communication unit 23.

The control unit 21 is constituted by one or more processors. As the processor, a general-purpose processor such as a CPU or a dedicated processor specialized for a particular process can be used. The control unit 21 may include one or more dedicated circuits, or in the control unit 21, one or more processors may be replaced with one or more dedicated circuits. As the dedicated circuit, for example, a FPGA or an ASIC can be used. The control unit 21 executes information processing relevant to a behavior of the map generation device 42, while controlling parts of the server 20, which is the map generation device 42.

The storage unit 22 is constituted by one or more memories. As the memory, for example, a semiconductor memory, a magnetic memory or an optical memory can be used. The memory may function as a main storage device, an auxiliary storage device or a cache memory. In the storage unit 22, information to be used for the behavior of the map generation device 42 and information obtained by the behavior of the map generation device 42 are stored.

The communication unit 23 is constituted by one or more communication modules. As the communication module, for example, a communication module for a LAN module can be used. The "LAN" is an abbreviation of Local Area network. The communication unit 23 receives the information to be used for the behavior of the map generation device 42, and sends the information obtained by the behavior of the map generation device 42.

A function of the map generation device 42 is realized when a map generation program according to the embodiment is executed by the processor included in the control unit 21. That is, the function of the map generation device 42 is realized by software. The map generation program is a program for causing a computer to realize a function corresponding to a step included in the behavior of the map generation device 42 by causing the computer to execute the step. That is, the map generation program is a program for causing the computer to function as the map generation device 42.

Some or all of the functions of the map generation device 42 may be realized by a dedicated circuit included in the control unit 21. That is, some or all of the functions of the map generation device 42 may be realized by hardware.

The terminal apparatus 30 is an apparatus that is used by the user. The terminal apparatus 30 may be configured as a mobile apparatus that is carried by the user, as exemplified by a smartphone, may be configured as a non-mobile apparatus that is used by the user in home or an office, as exemplified by a desktop PC, or may be an in-vehicle apparatus that is used by the user with the vehicle, as exemplified by a navigation device. The "PC" is an abbreviation of Personal Computer.

Figure 3:
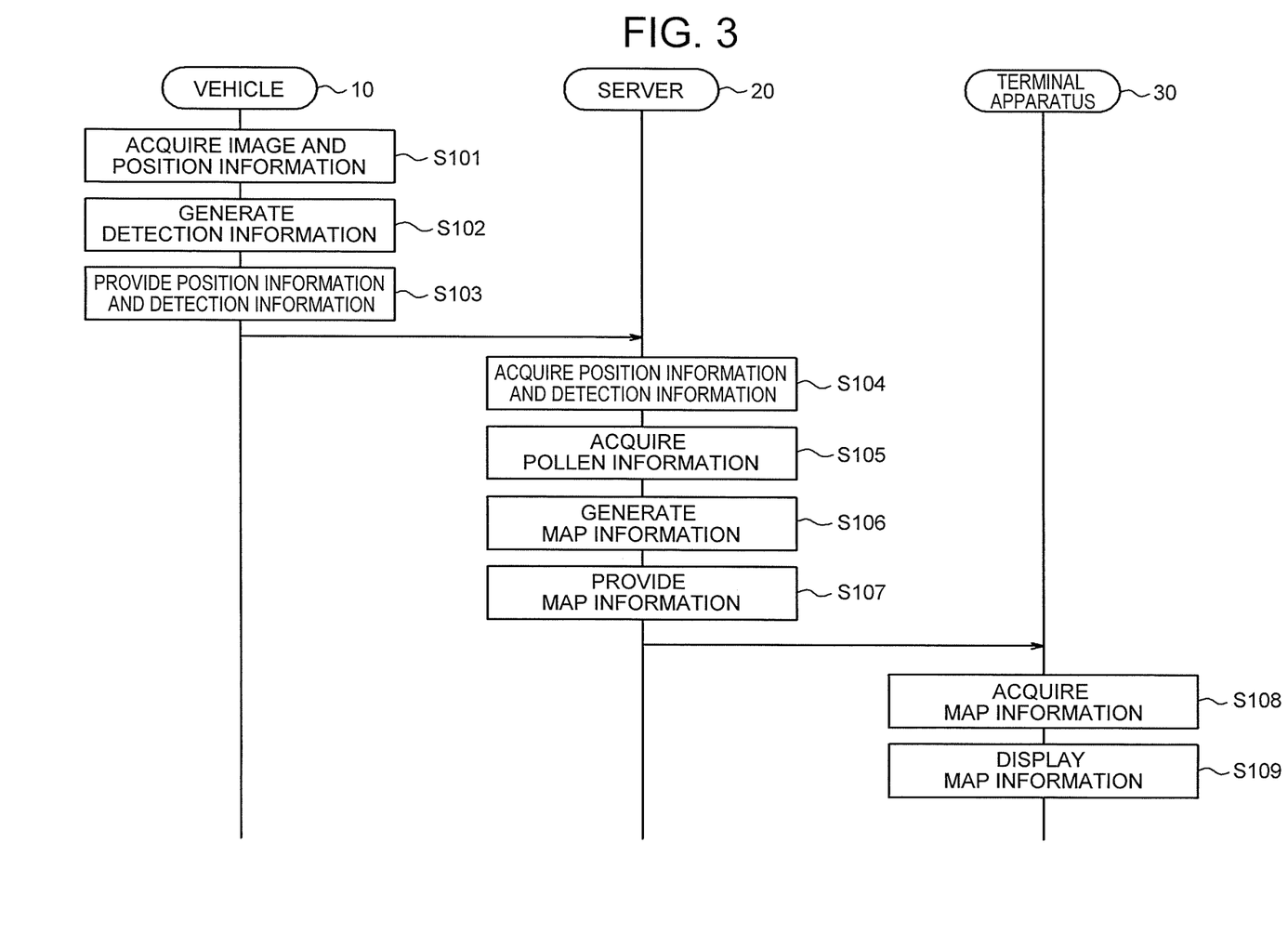
FIG. 3 is a flowchart showing a behavior of the map generation system according to the embodiment of the present disclosure.

A behavior of the map generation system 40 according to the embodiment will be described with reference to FIG. 3, in addition to FIG. 2. The behavior of the map generation system 40 corresponds to a map generation method according to the embodiment.

Processes in step S101 to step S103 are executed in the vehicle 10.

In step S101, the control unit 11 of the image analysis device 41 acquires the image 51 photographed from the vehicle 10 and the position information 52 about the vehicle 10 at the time when the image 51 is photographed.

Specifically, from the photographing unit 15, the control unit 11 acquires the image 51 of the exterior of the vehicle 10, as exemplified by the image of a forward view, lateral view or rearward view of the vehicle 10. The image 51 may be a moving image, or may be a still image. The control unit 11 acquires the position information 52 about the vehicle 10 at the current hour, from the positioning unit 14. For example, the position information 52 includes two-dimensional coordinates or three-dimensional coordinates of the current position of the vehicle 10 that are obtained using GPS, QZSS, GLONASS, Galileo, or a combination of two or more of them. The control unit 11 stores the image 51 acquired from the photographing unit 15, in the storage unit 12, and stores hour information indicating the current hour and the position information 52 acquired from the positioning unit 14, in the storage unit 12, in association with the image 51.

Together with the image 51, the control unit 11 may acquire the hour information indicating an hour when the image 51 was photographed, from the photographing unit 15. In that case, the control unit 11 acquires the position information 52 about the vehicle 10 at the hour indicated by the acquired hour information, from positioning unit 14. The control unit 11 stores the acquired image 51, in the storage unit 12, and stores the acquired hour information and position information 52, in the storage unit 12, in association with the image 51.

In step S102, by analyzing the image 51 acquired in step S101, the control unit 11 of the image analysis device 41 detects a person that wears an anti-pollen article, in the image 51, and generates the detection information 53 indicating the detection result. That is, the control unit 11 generates the detection information 53 indicating the result of the detection of the person that wears the anti-pollen article in the image 51.

Specifically, the control unit 11 analyzes the image 51 stored in the storage unit 12 in step S101, and recognizes pedestrians around the vehicle 10, persons that ride in other vehicles, and other persons. The control unit 11 further analyzes the image 51, and determines whether the recognized person wears an anti-pollen article such as a mask or glasses. As a technology for recognizing the person and the anti-pollen article within the image 51, for example, machine learning, pattern matching, feature point extraction, or an image recognition technology with a combination of the machine learning, the pattern matching and the feature point extraction can be used. An arbitrary related technology may be used. For example, the technology described in JP 2004-310397 A or JP 2008-083932 A may be used. As the detection information 53, the control unit 11 generates information indicating a total person number that is the number of recognized persons and a detected person number that is the number of persons for each of which it is determined that the person wears the anti-pollen article.

The detection information 53 may indicate, instead of the detected person number, a detection rate that is the rate of the detected person number to the total person number.

The detection information 53 may indicate, as the detected person number, the number of persons for each of which the control unit 11 determines that the person wears both the mask and the glasses. That is, the detected person number indicated by the detection information 53 may be a number resulting from excluding the number of persons that wear only the mask and the number of persons that wear only the glasses.

The detection information 53 may indicate, as the detected person number, the number of persons for each of which the control unit 11 determines that the person wears anti-pollen glasses. Unlike normal glasses, in the anti-pollen glasses, as a feature, a cover for the eyes is attached to a frame. By analyzing the image 51 and detecting the feature, the control unit 11 can distinguish between a person that wears the normal glasses and a person that wears the anti-pollen glasses.

The detection information 53 may further indicate a result of a detection of a wet condition of the eyes of the person that wears the anti-pollen article in the image 51. For example, the detection information 53 may indicate, as the detected person number, the number of persons for each of which the control unit 11 determines that the person wears the anti-pollen article and the eyes are wet. As a technology for recognizing the wet condition of the eyes of the person within the image 51, for example, the machine learning, the pattern matching, the feature point extraction, or an image recognition technology with a combination of the machine learning, the pattern matching and the feature point extraction can be used.

The detection information 53 may further indicate a result of a detection of a bloodshot condition of the eyes of the person that wears the anti-pollen article in the image 51. For example, the detection information 53 may indicate, as the detected person number, the number of persons for each of which the control unit 11 determines that the person wears the anti-pollen article and the eyes are bloodshot. As a technology for recognizing the bloodshot condition of the eyes of the person within the image 51, for example, the machine learning, the pattern matching, the feature point extraction, or an image recognition technology with a combination of the machine learning, the pattern matching and the feature point extraction can be used.

In the case where the in-vehicle camera included in the photographing unit 15 is disposed on the outside of the vehicle 10, the detection information 53 may further indicate a result of a detection of the pollen stuck to a lens of the in-vehicle camera in the image 51. In that case, by analyzing the image 51, the control unit 11 determines whether the pollen is stuck to the lens of the in-vehicle camera that is used for the photographing of the image 51. As a technology for recognizing the pollen stuck to the lens within the image 51, for example, the machine learning, the pattern matching, the feature point extraction, or an image recognition technology with a combination of the machine learning, the pattern matching and the feature point extraction can be used.

In the case where the in-vehicle camera included in the photographing unit 15 is disposed on the inside of the vehicle 10, the detection information 53 may further indicate a result of a detection of the pollen stuck to a window glass of the vehicle 10 that faces the lens of the in-vehicle camera in the image 51. In that case, by analyzing the image 51, the control unit 11 determines whether the pollen is stuck to the window glass of the vehicle 10 that exists in a photographing direction for the image 51. As a technology for recognizing the pollen stuck to the window glass within the image 51, for example, the machine learning, the pattern matching, the feature point extraction, or an image recognition technology with a combination of the machine learning, the pattern matching and the feature point extraction can be used.

In step S103, the communication unit 13 of the image analysis device 41 provides, to the map generation device 42, the position information 52 about the vehicle 10 acquired by the control unit 11 in step S101 and the detection information 53 generated by the control unit 11 in step S102.

Specifically, the control unit 11 inputs, to the communication unit 13, the hour information and position information 52 stored in the storage unit 12 in step S101 and the detection information 53 generated in step S102. The communication unit 13 sends the hour information, position information 52 and detection information 53 input from the control unit 11, to the map generation device 42, which is the server 20, by communication via the network 43.

The processes in step S101 to step S103 are repeatedly executed in the vehicle 10 that is moving. Alternatively, the processes in step S101 to step S103 are executed in a plurality of vehicles 10 at different positions.

A process in step S104 is executed by the server 20, whenever the processes in step S101 to step S103 are executed, that is, whenever the position information 52 and the detection information 53 are provided.

In step S104, the communication unit 23 of the map generation device 42 acquires the position information 52 about the vehicle 10 and the detection information 53 that are provided from the image analysis device 41 of the vehicle 10 in step S103.

Specifically, the communication unit 23 receives the hour information, position information 52 and detection information 53 sent from the image analysis device 41 of the vehicle 10 in step S103, through the network 43. From the communication unit 23, the control unit 21 acquires the hour information, position information 52 and detection information 53 received by the communication unit 23. The control unit 21 stores the acquired hour information, position information 52 and detection information 53, in the storage unit 22.

In the case where the position information 52 is sent from the image analysis device 41 of the vehicle 10 in an almost real-time way, the control unit 21 may store, in the storage unit 22, the information indicating the hour when the communication unit 23 received the position information 52 from the image analysis device 41 of the vehicle 10, as the hour information. In that case, the communication unit 23 does not need to receive the hour information from the image analysis device 41 of the vehicle 10.

A process in step S105 is executed by the server 20. The process in step S105 may be executed before the process in step S104.

In step S105, the communication unit 23 of the map generation device 42 acquires the pollen information 54 for each area.

Specifically, the communication unit 23 receives the pollen information 54 sent from a public server as part of a weather information service, through the network 43. From the communication unit 23, the control unit 21 acquires the pollen information 54 received by the communication unit 23. The control unit 21 stores the acquired pollen information 54 in the storage unit 22.

Processes in step S106 and step S107 are executed by the server 20, whenever the process in step S104 is executed, that is, whenever the position information 52 and the detection information 53 are acquired, for each of the position information 52 and detection information 53 acquired at that time. Alternatively, the processes in step S106 and step S107 are executed by the server 20, per unit period such as several minutes, several tens of minutes or several hours, collectively for all of the position information 52 and detection information 53 acquired in step S104 within the unit period.

In step S106, the control unit 21 of the map generation device 42 estimates the dispersion state of the pollen, based on the position information 52 about the vehicle 10 and the detection information 53 that are acquired by the communication unit 23 in step S104 and the pollen information 54 that is acquired by the communication unit 23 in step S105. The control unit 21 generates the map information 55 indicating the estimated dispersion state. The control unit 21 generates the map information 55 in step S106 once. Then, when the process in step S106 is executed again, the generated map information 55 may be updated, or the map information 55 may be newly generated.

Specifically, if the difference between the hour indicated by the hour information stored in the storage unit 22 in step S104 and the current hour falls within a specified period such as several minutes, several tens of minutes or several hours, the control unit 21 refers to the position information 52 and detection information 53 stored in the storage unit 22 in step S104 and the pollen information 54 stored in the storage unit 22 in step S105. The control unit 21 identifies the pollen dispersion amount depending on the detected person number indicated by the detection information 53, as a first dispersion amount. The first dispersion amount is identified using a table or expression for converting the detected person number into the pollen dispersion amount, or a function for estimating the pollen dispersion amount from the detected person number. Each of the table, expression and function to be used for identifying the first dispersion amount may be decided by an arbitrary method. For example, the table, the expression or the function is decided in advance, by performing a field investigation for relation between the number of persons each of which wears the anti-pollen article and the pollen dispersion amount and analyzing a result of the field investigation. For an area containing the position indicated by the position information 52, the control unit 21 adopts the pollen dispersion amount indicated by the pollen information 54, as a second dispersion amount, and compares the second dispersion amount with the first dispersion amount. The second dispersion amount is a predicted value of the pollen dispersion amount in a broad area. If the difference between the first dispersion amount and the second dispersion amount does not exceed a threshold, the control unit 21 determines that the first dispersion amount is correct, and generates or updates the map information 55 by performing mapping of the first dispersion amount at a position on a map that is indicated by the position information 52.

If the difference between the first dispersion amount and the second dispersion amount exceeds the threshold, the control unit 21 determines that the first dispersion amount is incorrect, and does not perform the mapping of the first dispersion amount. Each of the first dispersion amount and the second dispersion amount may be expressed by an arbitrary unit such as the number of pollen particles per square centimeter or the number of pollen particles per cubic meter, and may be conveniently expressed by a numerical value indicating a level of five levels.

In the case where the detection information 53 indicates the detection rate instead of the detected person number, the control unit 21 identifies the pollen dispersion amount depending on the detection rate, as the first dispersion amount. The first dispersion amount is identified using a table or expression for converting the detection rate into the pollen dispersion amount, or a function for estimating the pollen dispersion amount from the detection rate. Each of the table, expression and function to be used for identifying the first dispersion amount may be decided by an arbitrary method. For example, the table, the expression or the function is decided in advance, by performing the field investigation for relation between the rate of the person that wears the anti-pollen article and the pollen dispersion amount and analyzing the result of the field investigation.

In the case where the detection information 53 indicates, as the detected person number, the number of persons for each of which the control unit 11 determines that the person wears both the mask and the glasses, the detected person number is unlikely to include the number of persons each of which wears the mask for a different purpose from a pollen measure. Therefore, the correctness of the first dispersion amount, that is, the estimation accuracy for the dispersion state of the pollen increases.

In the case where the detection information 53 indicates, as the detected person number, the number of persons for each of which the control unit 11 determines that the person wears the anti-pollen glasses, the detected person number is unlikely to include the number of persons each of which wears the normal glasses. Therefore, the correctness of the first dispersion amount, that is, the estimation accuracy for the dispersion state of the pollen increases.

In the case where the detection information 53 indicates, as the detected person number, the number of persons for each of which the control unit 11 determines that the person wears the anti-pollen article and the eyes are wet, the detected person number is unlikely to include the number of persons each of which wears the mask for a different reason from hay fever. Therefore, the correctness of the first dispersion amount, that is, the estimation accuracy for the dispersion state of the pollen increases.

In the case where the detection information 53 indicates, as the detected person number, the number of persons for each of which the control unit 11 determines that the person wears the anti-pollen article and the eyes are bloodshot, the detected person number is unlikely to include the number of persons each of which wears the mask for a different reason from hay fever. Therefore, the correctness of the first dispersion amount, that is, the estimation accuracy for the dispersion state of the pollen increases.

The control unit 21 may generate the map information 55, only in the case where the detection information 53 indicates the determination result that the pollen is stuck to the lens of the in-vehicle camera that is used for the photographing of the image 51 or to the window glass of the vehicle 10 that exists in the photographing direction for the image 51. In that case, the correctness of the first dispersion amount, that is, the estimation accuracy for the dispersion state of the pollen increases.

The control unit 21 may generate the map information 55 without comparing the first dispersion amount and the second dispersion amount. In that case, the control unit 21 does not need to refer to the pollen information 54, and therefore may skip the process in step S105.

The control unit 21 may check the map information 55 when appropriate, and if there is a first dispersion amount mapped based on the position information 52 and detection information 53 acquired before the last specified period, the control unit 21 may remove the first dispersion amount from the map information 55.

In the embodiment, the control unit 21 performs the mapping of the first dispersion amount, to a position where the first dispersion amount is identified for at least one vehicle 10. However, the control unit 21 may perform the mapping of the first dispersion amount, only to a position where almost the same first dispersion amount is identified for a specified number or more of vehicles 10. In that case, the reliability of the map information 55 increases.

In step S107, the communication unit 23 of the map generation device 42 provides the map information 55 generated or updated by the control unit 21 in step S106, to the terminal apparatus 30.

Specifically, the control unit 21 inputs the map information 55 generated or updated in step S106, to the communication unit 23. The communication unit 23 sends the map information 55 input from the control unit 21, to the terminal apparatus 30, through the network 43.

Processes in step S108 and step S109 are executed by the terminal apparatus 30, whenever the process in step S107 is executed, that is, whenever the map information 55 is provided.

In step S108, the terminal apparatus 30 acquires the map information 55 provided in step S107 from the map generation device 42, which is the server 20.

Specifically, the terminal apparatus 30 receives the map information 55 sent in step S107 from the map generation device 42, which is the server 20, through the network 43.

In step S109, the terminal apparatus 30 displays the map information 55 acquired in step S108, to the user.

Specifically, the terminal apparatus 30 displays a screen containing the map information 55 received in step S108, on a display. On this screen, the map information 55 is displayed such that a numeral, a character, a figure such as an icon, or a combination of them that indicates the mapped first dispersion amount is disposed at one or more positions on the map. A figure such as an icon of a human may be displayed at the current user position on the same map.

As described above, the image analysis device 41 of the vehicle 10 analyzes the image 51 photographed from the vehicle 10. The image analysis device 41 detects the person that wears the anti-pollen article in the image 51. The image analysis device 41 generates the detection information 53 indicating the detection result. The image analysis device 41 provides the position information 52 about the vehicle 10 at the time when the image 51 is photographed, and the generated detection information 53, to the map generation device 42. The map generation device 42 acquires the position information 52 about the vehicle 10 and the detection information 53 that are provided from the image analysis device 41. The map generation device 42 estimates the dispersion state of the pollen, based on the acquired position information 52 about the vehicle 10 and the acquired detection information 53. The map generation device 42 generates the map information 55 indicating the estimated dispersion state. Accordingly, with the embodiment, it is possible to obtain granular information relevant to the dispersion state of the pollen. That is, it is possible to obtain information that is useful for a user suffering from hay fever.

The image analysis device 41 may be configured as a server in a cloud computing system or another computing system. The server may be the server 20, or may be a different server from the server 20.

Figure 4:
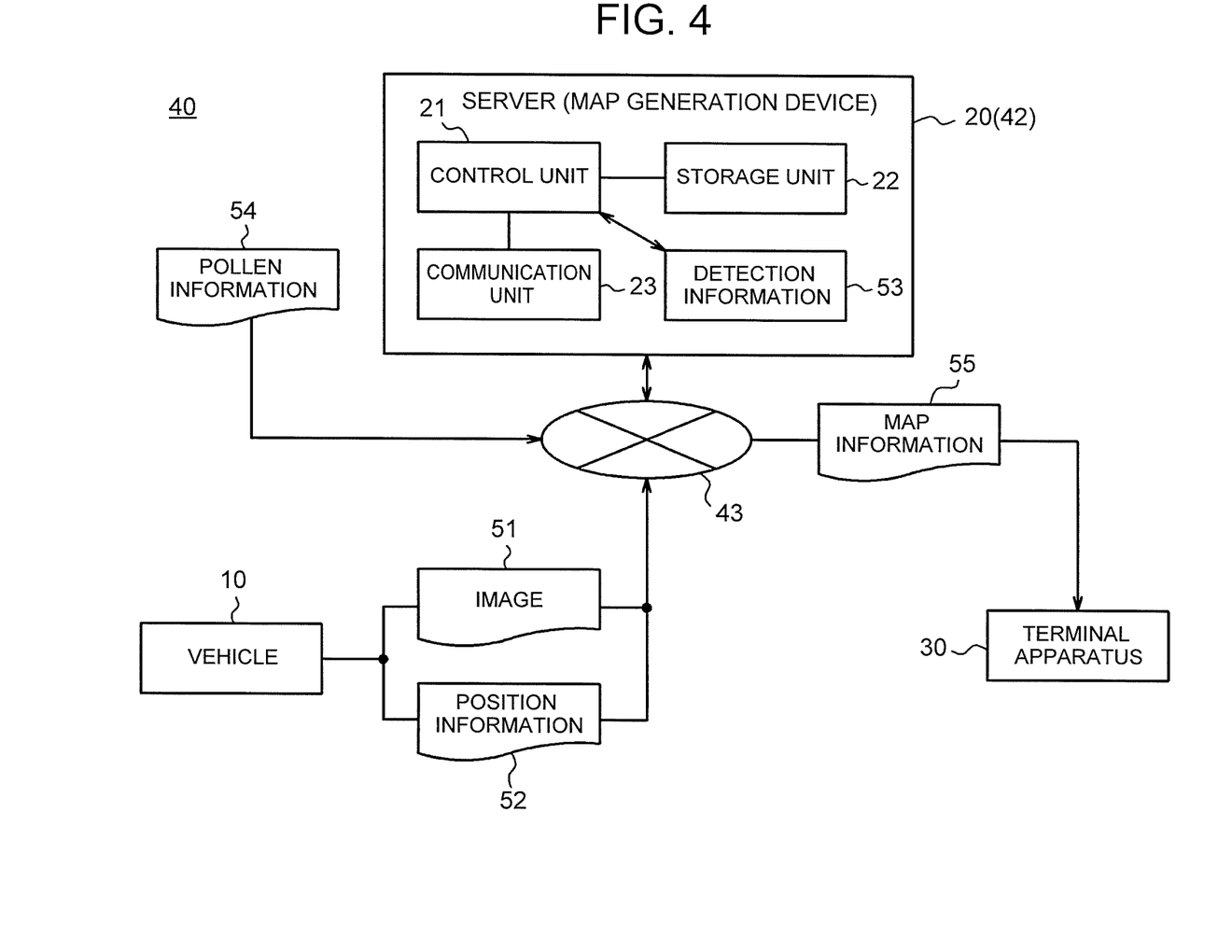
FIG. 4 is a block diagram showing a configuration of a map generation system according to a modification of the embodiment of the present disclosure.
Figure 5:
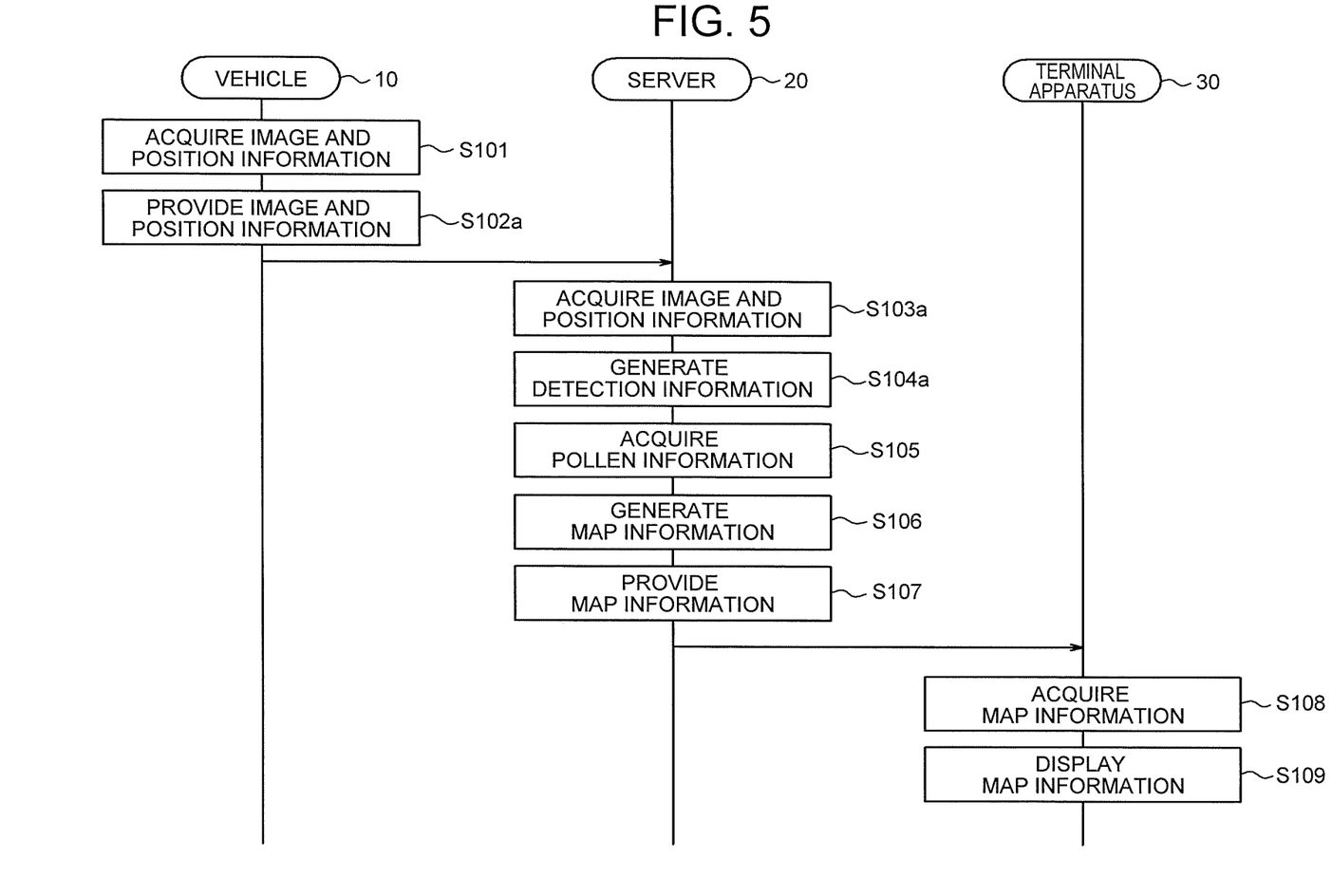
FIG. 5 is a flowchart showing a behavior of the map generation system according to the modification of the embodiment of the present disclosure.

In the case where the image analysis device 41 is configured as the server 20, the image analysis device 41, as shown in FIG. 4, is integrated with the map generation device 42. As shown in FIG. 5, the process in step S102 is executed by the server 20, as a process in step S104a. Therefore, in step S102a after step S101, necessary information for the process in step S104a, as exemplified by the image 51 and the position information 52 about the vehicle 10 that are acquired in step S101, is provided from the vehicle 10 to the server 20. In step S103a after step S102a, the communication unit 23 of the map generation device 42 acquires the image 51 and the position information 52 about the vehicle 10 that are provided from the vehicle 10 in step S102a. In step S104a, by analyzing the image 51 acquired by the communication unit 23 in step S103a, the control unit 21 of the map generation device 42 detects the person that wears the anti-pollen article, in the image 51, and generates the detection information 53 indicating the detection result. That is, the control unit 21 generates the detection information 53 indicating the result of the detection of the person that wears the anti-pollen article in the image 51. The detection information 53 is used for generating or updating the map information 55 in the process in step S106.

In the case where the image analysis device 41 is configured as a server X that is a different server from the server 20, the processes in step S102 and step S103 are executed by the server X. Whenever the process in step S101 is executed in the vehicle 10, necessary information for the processes in step S102 and step S103, as exemplified by the image 51 and the position information 52 about the vehicle 10 that are acquired in step S101, is uploaded from the vehicle 10 to the server X. In step S103, necessary information for the processes in step S104 to step S107, as exemplified by the position information 52 about the vehicle 10 and the detection information 53, is transmitted from the server X to the server 20.

An applicable embodiment of the present disclosure is not limited to the above-described embodiment. For example, a plurality of blocks described in the block diagrams may be integrated, and a single block may be divided. A plurality of steps described in the flowcharts, instead of being executed in chronological order as described, may be executed in parallel or in a different order, depending on processing powers of devices that executes the steps, or as necessary. In addition, modifications can be made without departing from the spirit of the present disclosure.

What is claimed is:
1. A map generation device comprising:
a communication unit that acquires position information about a vehicle at a time when an image is photographed from the vehicle; and
a control unit that estimates a dispersion state of pollen, based on the position information about the vehicle acquired by the communication unit and detection information indicating a result of a first detection in the image, and generates map information indicating the estimated dispersion state, the first detection in the image being a detection of a person that wears an anti-pollen article.

2. The map generation device according to claim 1, wherein the detection information further indicates a result of a second detection in the image, the second detection in the image being a detection of at least one of a wet condition and a bloodshot condition of an eye of the person that wears the anti-pollen article.

3. The map generation device according to claim 1, wherein the detection information further indicates a result of a third detection in the image, the third detection in the image being a detection of pollen stuck to a lens of an exterior vehicle camera that is used for the photographing of the image or to a window glass of the vehicle that exists in a photographing direction for the image.

4. The map generation device according to claim 1, wherein:
   the communication unit further acquires pollen information for each area; and
   the control unit estimates the dispersion state, based on the position information about the vehicle, the detection information, and the pollen information acquired by the communication unit.

5. The map generation device according to claim 1, wherein:
   the communication unit further acquires the image; and
   the control unit analyzes the image acquired by the communication unit, and generates the detection information.

6. A map generation system comprising:
   the map generation device according to claim 1; and
   an image analysis device that analyzes the image, generates the detection information, and provides the detection information to the map generation device.

7. The map generation system according to claim 6, wherein the image analysis device is included in the vehicle, and further provides the position information about the vehicle to the map generation device.

8. A map generation method comprising:
   a communication unit acquiring position information about a vehicle at a time when an image is photographed from the vehicle; and
   a control unit estimating a dispersion state of pollen, based on the position infbrmation about the vehicle acquired by the communication unit and detection infbrmation indicating a result of a first detection in the image, and generating map information indicating the estimated dispersion state, the first detection in the image being a detection of a person that wears an anti-pollen article.

9. A non-transitory storage medium storing instructions that are executable by one or more processors and that cause the one or more processors to perform functions comprising:
   acquiring position information about a vehicle at a time when an image is photographed from the vehicle; and
   estimating a dispersion state of pollen, based on the acquired position information about the vehicle and detection information indicating a result of a first detection in the image, and generating map information indicating the estimated dispersion state, the first detection in the image being a detection of a person that wears an anti-pollen article.

* * * * *